Patented Mar. 29, 1938

2,112,793

UNITED STATES PATENT OFFICE 2,112,793

HYDRATION OF HIGHER OLEFINES

Herbert Muggleton Stanley, Tadworth, and James Ernest Youell, Wallington, England No Drawing. Application October 20, 1936, Serial No. 106,692. In Great Britain February 25, 1936

7 Claims. (Cl. 260—156)

This invention relates to the conversion of olefines containing three or more carbon atoms in the molecule into the corresponding alcohols.

Difficulty is experienced in the vapour phase hydration of such olefines, using solid catalysts, owing to the high temperatures required (250° C. or higher), which give rise to polymerization products, and moreover the amount of conversion in a single passage over the catalysts is comparatively small. The usual method of treating such higher olefines for conversion into alcohols is absorption in relatively concentrated sulphuric acid, e. g., sulphuric acid of 50 to 90 per cent strength, diluting the resulting alkyl sulphuric acid obtained and distilling off the desired alcohol. Absorption processes of this kind cannot readily, from their nature, be made continuous.

The chief object of the present invention is to provide an improved continuous liquid phase process and more particularly one that does not involve a distillation step to recover the produced alcohol from the acid nor the deliberate addition of an alcohol extracting agent.

According to the present invention advantage is taken of the fact that within certain limits of operating conditions the unchanged surplus liquid olefine itself serves as the extracting agent for the produced alcohol. The process of the present invention may be stated to consist essentially in continuously subjecting the higher olefine and an amount of water adequate for the desired conversion to intimate contact with an inorganic polybasic acid not exceeding about 40 per cent in strength at a pressure sufficient to maintain substantially all the olefine in the liquid state and at a temperature that ensures a partition of the produced alcohol between the unchanged liquid olefine and the acid sufficiently in favor of the liquid olefine to render separation quite practicable industrially simply by continuous separation of the hydrocarbon-alcohol layer from the acid layer, such temperature ranging from 50 to 150° C.

The alcohol is then recovered from the unchanged olefine and the latter is returned to the process with fresh water. The continuous addition of water is so regulated that the strength of the catalytic aqueous acid remains substantially constant this operation per se being known in absorption processes.

If desired, a hydrocarbon diluent such as a paraffin hydrocarbon may be employed in conjunction with the liquid olefine to ensure a more effective partition of the resultant alcohol between the olefine and the acid. The use of a hydrocarbon diluent also renders possible the employment of higher pressures and/or lower temperatures than when using the pure olefine alone. This is of advantage particularly in the case when propylene has to be treated. The catalytic action of the acid in effecting the hydration may also, if desired, be assisted by adding known activating agents such as silver sulphate or cuprous salts.

Particularly suitable polybasic mineral acids are aqueous sulphuric acid or phosphoric acids but other acids, as for example arsenic acids or oxygenated sulphur-containing acids such as dithionic acid and the like may be used provided they are sufficiently soluble in water to give an aqueous solution of reasonable strength and do not exert any substantial action on the olefine other than the desired hydrating effect. For this reason acids such as chromic acid would be unsuitable.

As the workability of the invention on an industrial scale is due to the selective partition of the resultant alcohol between the aqueous acid and the unchanged liquid olefine in favour of the latter, the operating conditions must be such as to ensure the partition towards the olefine. For this reason the aqueous acid must not have a concentration greater than about 40 per cent. Within such limit of acid concentration, the partition of the alcohol in favour of the liquid olefine becomes more favourable the greater the temperature. Therefore somewhat strong acid operating at low temperature is less favourable to the desired partition than weaker acid at higher temperature. Of course high temperature with strong acid must in any event be avoided because although the catalytic activity of such acid may be great there is a tendency to polymerize the product and form other undesired by-products.

Having in mind the nature of any particular olefine and that the process has to be carried on with the olefine maintained in the liquid phase, the operating temperatures and pressures must be suitably selected and inter-related. In the case of pure propylene, a pressure of about 40 atmospheres, a temperature of about 80° C., and sulphuric acid of about 30 to 40 per cent strength are suitable; in the case of the butylenes, a pressure of about 15 to 20 atmospheres, a temperature of about 100° C., and sulphuric acid of about 20 to 40 per cent strength; in the case of still higher simple olefines, such as amylene and of di-olefines such as 1.3 butadiene, temperatures of about 100° C. to 150° C. are suitable with relatively low pressures not exceeding about 20 atmospheres and with catalytic acid concentrations of only 10 to 15 per cent.

The plant and procedure for carrying out the invention can be quite simple. For example the dilute acid may be contained in a tank or tower provided if necessary with an agitating device and/or baffles, and the liquid olefine and the amount of water appropriate for hydration may be injected either separately or as a premixed or emulsified mass—into the lower part of the tower so as to rise therein. The alcohol formed from part of the olefine is dissolved in the remaining unchanged olefine which collects as a layer on the aqueous acid and can be continuously drawn off.

The decanted alcohol-olefine mixture may of course be treated for recovery of the alcohol in any known manner, as by continuous countercurrent washing with water or by fractional distillation and the alcohol-free olefine then be returned to the process.

*Example*

The following are particulars of one way of carrying out the invention using liquid trimethylethylene:—

The liquid trimethylethylene was pumped, under sufficient pressure to maintain it in the liquid phase namely about 10 to 15 atmospheres, into the bottom of a heated lead lined tower packed with rings and containing 15 per cent aqueous sulphuric acid to a height of 5 ft. The liquid olefine ascended in the form of a stream of globules up through the column of acid and the layer of it riding on the acid was led away through a suitable release valve and coolers. The whole plant was maintained at the aforesaid pressure of about 10 to 15 atmospheres throughout the process, while the acid concentration was maintained constant by regulated addition of water in liquid form. With a contact temperature of about 120° C. and a feed rate of 1120 grams per hour of the olefine, the resultant tertiary amyl alcohol continuously being carried away in solution in the unchanged olefine layer continuously drawn off corresponded to a conversion per passage of 2.5 per cent. With more intimate contact of the olefine and the acid catalyst, still higher conversions are obtainable with a very high throughput of the olefine per unit volume of the catalytic liquid.

The process is not only applicable to simple olefines such as propylene, butylene, amylene and so forth but may also be used for the production of hydration products from conjugated diolefine hydrocarbons such as 1.3 butadiene.

What we claim is:

1. The method of converting olefines containing more than two carbon atoms in the molecule into the corresponding alcohols which comprises continuously subjecting the olefine and an amount of water adequate for the desired conversion to intimate contact with an inorganic polybasic acid not exceeding about 40 per cent in strength at a pressure sufficient to maintain substantially all the olefine in the liquid state and at a temperature that ensures a partition of the produced alcohol between the unchanged liquid olefine and the acid sufficiently in favor of the liquid olefine to render separation quite practicable industrially simply by continuous separation of the hydrocarbon-alcohol layer from the acid layer, such temperature ranging from about 50° to about 150° C., and then separating off the hydrocarbon-alcohol layer and obtaining the alcohol therefrom.

2. The method according to claim 1 in which the amount of water continuously used with the olefine is so regulated as to maintain the strength of the aqueous acid catalyst substantially constant.

3. The method according to claim 1 in which intimate contact of the reactants is ensured by causing the olefine and the water to rise up through a column of the aqueous acid.

4. The method of converting olefines containing more than two carbon atoms in the molecule into the corresponding alcohols, which comprises passing a stream of the olefine and an amount of water adequate for the resultant conversion as into the lower region of a column of sulphuric acid not exceeding about 40 per cent in strength acting as catalyst, maintaining the aqueous acid at a moderately elevated temperature of about 80° C. to about 150° C. depending on the olefine treated and under a pressure sufficient to maintain substantially all of the olefine in the liquid state, drawing off the supernatant layer of unchanged liquid olefine containing the formed alcohol, separating out the alcohol from the olefine, and returning the latter to the process.

5. The method of converting propylene into the corresponding alcohol which comprises passing a stream of liquid propylene and an amount of water adequate for the conversion into the lower region of a column of aqueous sulphuric acid of about 30 to about 40 per cent strength, maintaining the acid at about 80° centigrade and under a pressure of about 40 atmospheres, drawing off the supernatant layer of unchanged liquid propylene containing the formed alcohol, separating out the alcohol from the propylene, and returning the latter to the process.

6. The method of converting any of the butylenes into the corresponding alcohol which comprises passing a stream of the liquid butylene and an amount of water adequate for the conversion into the lower region of a column of aqueous sulphuric acid of about 20 to about 40 per cent strength, maintaining the acid at about 100° C. and under a pressure of about 15 to about 20 atmospheres, drawing off the supernatant layer of unchanged liquid butylene containing the formed alcohol, separating out the alcohol from the butylene, and returning the latter to the process.

7. The method of converting any of the amylenes into the corresponding alcohol which comprises passing a stream of the liquid amylene and an amount of water adequate for the conversion into the lower region of a column of aqueous sulphuric acid of about 15 per cent strength, maintaining the acid at about 120° C. and under a pressure of about 10 to about 15 atmospheres, drawing off the supernatant layer of unchanged liquid amylene containing the formed alcohol, separating out the alcohol from the amylene, and returning the latter to the process.

HERBERT MUGGLETON STANLEY.
JAMES ERNEST YOUELL.